US009446620B1

(12) United States Patent
Safar

(10) Patent No.: US 9,446,620 B1
(45) Date of Patent: Sep. 20, 2016

(54) USER ADJUSTABLE PAPER CLIP

(71) Applicant: Samir Hanna Safar, San Diego, CA (US)

(72) Inventor: Samir Hanna Safar, San Diego, CA (US)

(73) Assignee: Samir Hanna Safar, San Diego, CA (US)

( * ) Notice: Subject to any disclaimer, the term of this patent is extended or adjusted under 35 U.S.C. 154(b) by 0 days.

(21) Appl. No.: 14/804,335

(22) Filed: Jul. 21, 2015

(51) Int. Cl.
*B42F 1/04* (2006.01)
*B42F 1/00* (2006.01)
*F16B 5/00* (2006.01)

(52) U.S. Cl.
CPC ............ *B42F 1/006* (2013.01); *F16B 5/0012* (2013.01); *Y10T 24/204* (2015.01)

(58) Field of Classification Search
CPC ........... B42F 1/006; B42F 1/00; B42F 1/02; B42F 1/04; F16B 5/0012; Y10T 24/204; Y10T 24/203
USPC .................................................. 24/67.5, 67.7
See application file for complete search history.

(56) References Cited

U.S. PATENT DOCUMENTS

| | | | | |
|---|---|---|---|---|
| 3,324,864 | A | 6/1967 | Triangolo | |
| 4,920,614 | A | 5/1990 | Tsukamoto | |
| 5,638,583 | A * | 6/1997 | Tseng | B42F 1/006 24/499 |
| 7,500,301 | B2 | 3/2009 | Cassaday | |

* cited by examiner

*Primary Examiner* — Abigail Morrell

(57) ABSTRACT

The present invention relates to an adjustable paper clip which facilitates the user to grip desired size of paper bundle. The user makes adjustments in the first element of an adjustable paper clip to enable the user to open it at a required distance for gripping the desired size of paper bundle.

5 Claims, 5 Drawing Sheets

USER ADJUSTABLE PAPER CLIP

BACKGROUND

Presently there are varieties of clamping devices available to grip paper bundle such as staplers, clip board pins, paper clips and the like. It is often observed that, the use of staplers and clipboard pins causes damage to the paper and thus put impression of pins or staplers on it which is highly undesirable. Also, the staplers have a limitation as they are restricted to staple a limited size of paper bundle. In such case, bigger stapler is desired in order to staple a bigger size of paper bundle which is undesirable for the user.

The other extensively used clamping device is a paper clip and is available in the two most pervasive forms. One, it is available as a loop of wire with a single loop facing in one direction and a pair of nesting loops facing in the other direction and two, as a two steel wires attached to a steel strip at their front end making an isometric triangle for griping the paper bundle. However, the limitations with these conventional paper clips are their sizes which enable them to grip a limited size of paper bundle. The user has to purchase a bigger size of paper clip to grip bigger paper bundle. Thus, the user has to buy different variants of paper clips in accordance with the size of paper bundle which is highly undesirable.

In prior art U.S. Pat. No. 4,920,614, the inventor proposes a plastic paper clip which is adjusted by sliding the clamping plate on it. However, the drawback of this invention is the clamping device has a limited area to slide and thus restricting the opening of a paper clip at a certain distance thereby making it undesirable to grip larger paper bundle.

In yet another prior art U.S. Pat. No. 7,500,301, the inventor proposes two clamping elements which are adjusted by sliding an adjustable thickness mean Since the adjustable thickness mean allows the paper clip to open at a certain angle, this paper clip has a restriction of gripping only limited size of paper bundle.

In yet another prior art CN203077901U, the inventor proposes the user to adjust the paper clip by adjusting nut and bolt of the paper clip. The user has to adjust the bolt to adjust the height of the paper clip in order to grip required size of paper bundle. Therefore, the user has a restriction of using this paper clip according to the height of the bolt.

Thus, there remains a need to eliminate the above mentioned shortcomings in the existing prior art. Therefore, the present invention facilitates the user to have an adjustable paper clip which enables the user to grip different size of paper bundle by sliding the first element of the adjustable paper clip into the second element.

SUMMARY

The main objective of present invention is to provide an adjustable paper clip which eliminates the shortcomings of the prior art and facilitates the user to grip desired size of paper bundle.

In order to achieve the above mentioned objective, the present invention provides an adjustable paper clip comprising of two elements, the first element and the second element. Wherein, the first end of the first element comprises of a handle and at least one male member having different adjustment gear on them. Further, the first end of the second element comprises of a handle and at least one female member. The second end of both the first element and the second element forms a gripper which enables to grip the paper bundle In an embodiment, the user slides the female member into an appropriate gear of the male member so as to open the second end of both the first element and the second element at a desired distance. Thereafter, the adjustable paper clip is enabled to grip desired size of paper bundle.

DETAILED DESCRIPTION

Figure 1A:
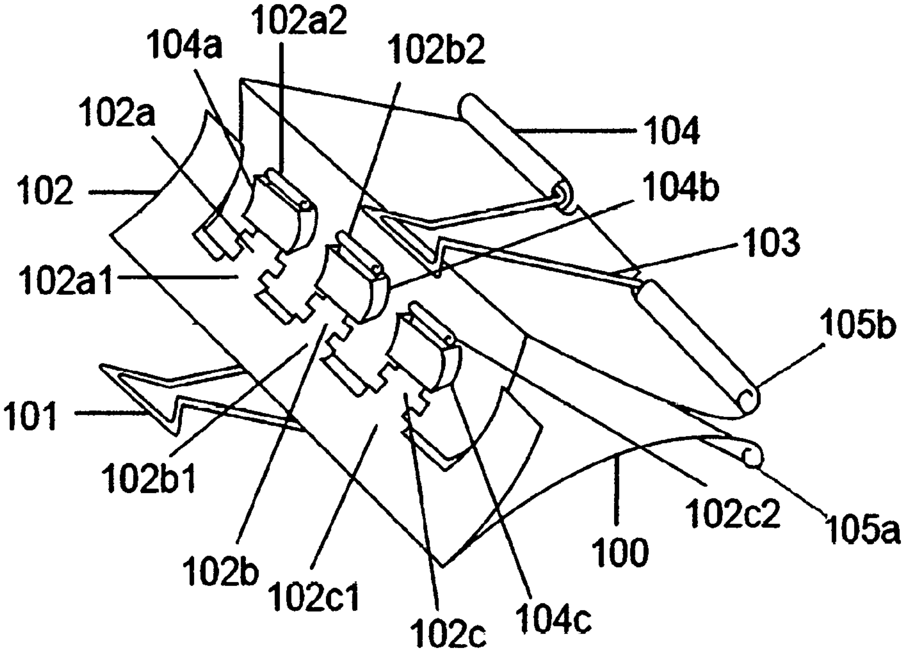
FIG. 1*a* illustrates the isometric view of the adjustable paper clip 100.

Reference will now be made in detail to the exemplary embodiment (s) of the invention, examples of which are illustrated in the accompanying drawings. Whenever possible, the same reference numerals will be used throughout the drawings to refer to the same or like parts.

FIG. 1*a* illustrates the isometric view of the adjustable paper clip 100 comprising of two curved elements, the first element 102 and the second element 104. Wherein, the first element 102 comprises of a handle 101 and at least one male member, more preferably three male members 102*a*, 102*b* and 102*c* having first end 102*a*1, 102*b*1 and 102*c*1 integrally attached to the first element 102 and second end of male members as a curved surface 102*a*2, 102*b*2 and 102*c*2. Each of the three male members 102*a*, 102*b* and 102*c* further comprises of at least one gear more preferably three gear [a1, b1, c1], [a2, b2, c2] and [a3, b3 and c3] for making adjustments in the adjustable paper clip. Further, the second element 104 comprises of a handle 103 and at least one female member, more preferably three female members 104*a*, 104*b* and 104*c*. The breadth of the curved surfaces 102*a*2, 102*b*2 and 102*c*2 of male members 102*a*, 102*b* and 102*c* is kept more than breadth of opening of the female members 104*a*, 104*b* and 104*c*. The pressure exerted by the curved surfaces 102*a*2, 102*b*2 and 102*c*2 on the opening of the female member 104*a*, 104*b* and 104*c* respectively ensures that the first element 102 and second element 104 does not separate and fall apart. Moreover, the second end 105*a* of the first element 102 and the second end 105*b* of second element 104 form a gripper of the adjustable paper grip.

Figure 1B:
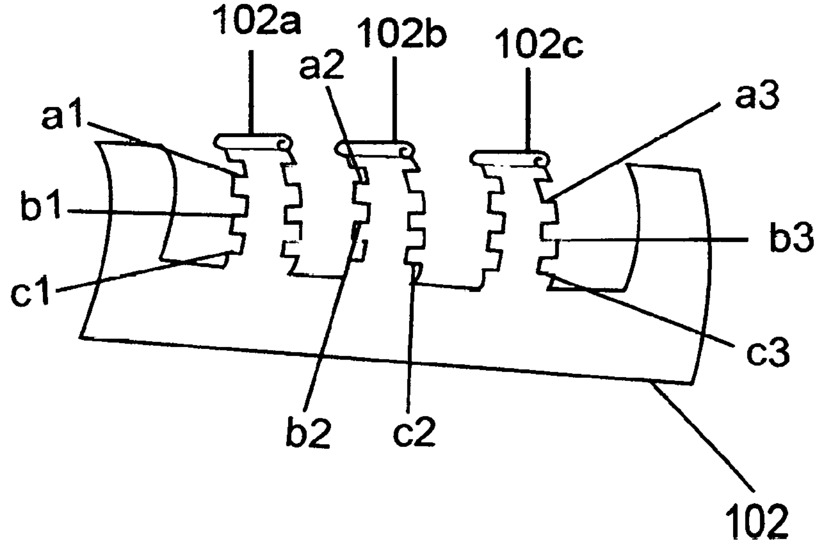
FIG. 1*b* illustrates the front view of the first element 102 of the adjustable paper clip 100.

FIG. 1*b* illustrates the view representing the first element 102 of the adjustable paper clip 100. Each male member 102*a*, 102*b* and 102*c* comprises at least one gear, more preferably three gears [a1, b1 and c1], [a2, b2 and c2] and [a3, b3 and c3] respectively.

Figure 2A:
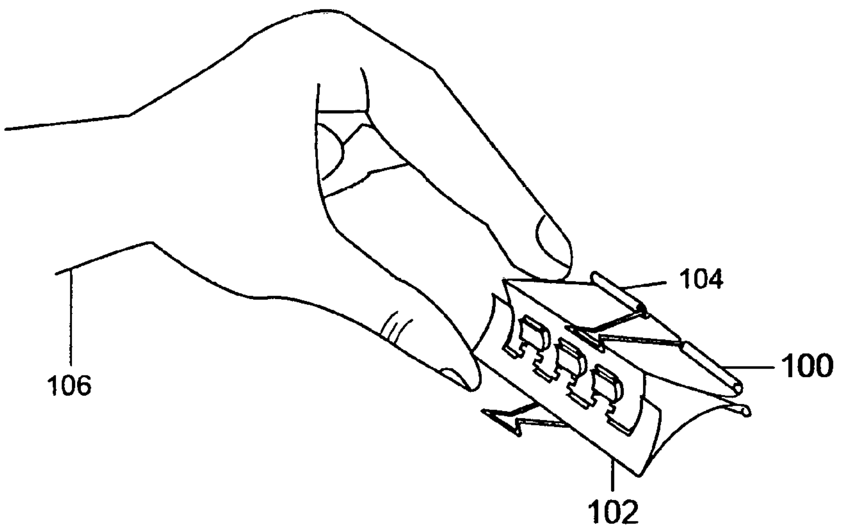
FIG. 2*a* illustrates the isometric view of the user 106 adjusting the first element 102 into the second element 104 of the adjustable paper clip 100.

FIG. 2*a* illustrates the isometric view of the user 106 adjusting the first element 102 and the second element 104 of the adjustable paper clip 100 which enables the male members 102*a*, 102*b* and 102*c* of first element 102 to slide into the respective female members 104*a*, 104*b* and 104*c* of the second element 104.

Figure 2B:
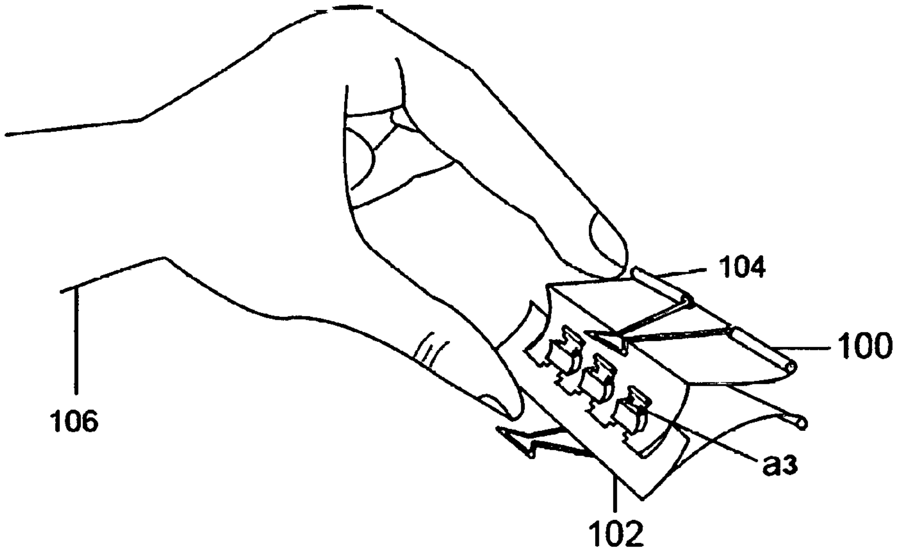
FIG. 2*b* illustrates the isometric view of the adjusted second element 104 at the first gear a1 of the first element 102.

FIG. 2*b* illustrates the isometric view of the adjusted second element 104 at the first gear a1, a2 and a3 of the first element 102. Wherein, the user 106 adjusts the female member 104*a*, 104*b* and 104*c* onto the first gear a1, a2 and a3 of the respective male members 102*a*, 102*b* and 102*c*.

Figure 3A:
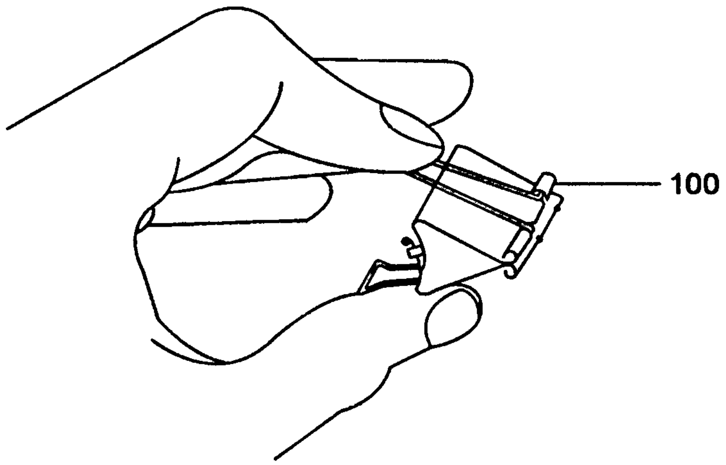
FIG. 3*a* illustrates the side view of the adjustable paper clip 100.

FIG. 3*a* illustrates the side view of the adjustable paper clip 100 opened by the user 106. The user 106 is enabled to open the adjustable paper clip 100 using handles 101 and 103.

Figure 3B:
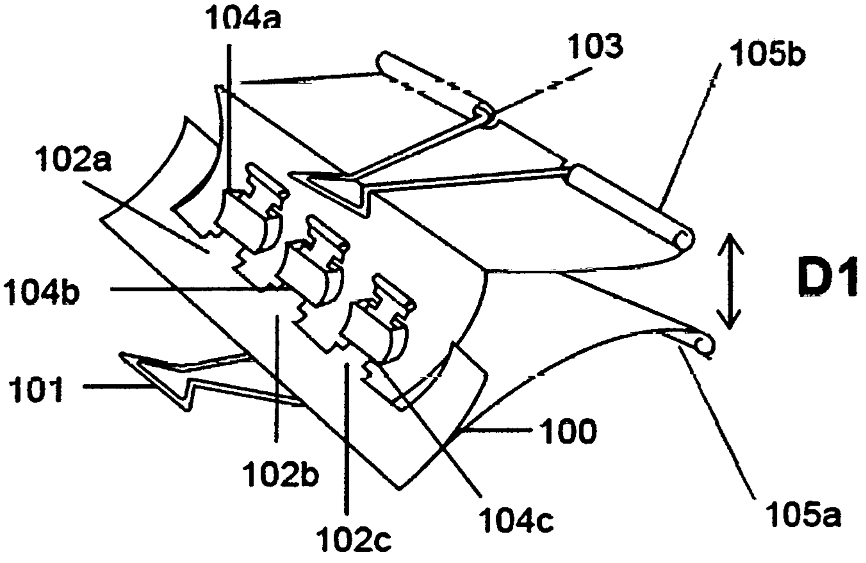
FIG. 3*b* illustrates the isometric view of the adjustable paper clip 100 opened at a distance of D1.

FIG. 3*b* illustrates the isometric view of the adjustable paper clip 100 opened at a distance D1. The adjustable paper clip 100 is opened at the distance D1 when the user 106 opens the second end 105*a* of the first element and second end 105*b* of the second element using handles 101 and 103.

Figure 4:
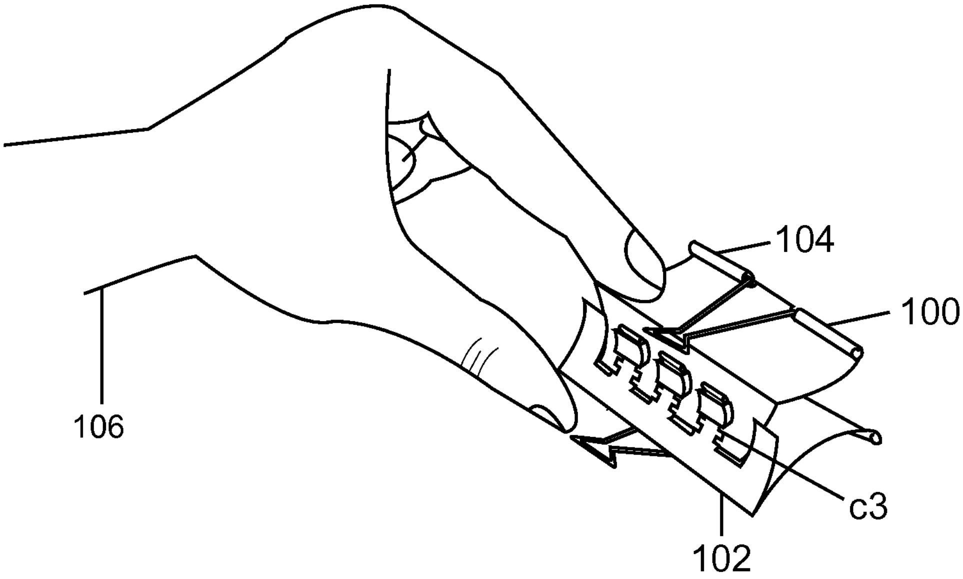
FIG. 4 illustrates the isometric view of the adjusted second element 104 at the third gear c3 of the first element 102.

FIG. 4 illustrates the isometric view of the adjusted second element 104 at the third gear c1, c2, and c3 of the first element 102 of adjustable paper clip 100. The user 106 adjusts the female members 104*a*, 104*b* and 104*c* onto the third gear c1, c2 and c3 of the respective male members 102*a*, 102*b* and 102*c*.

Figure 5:
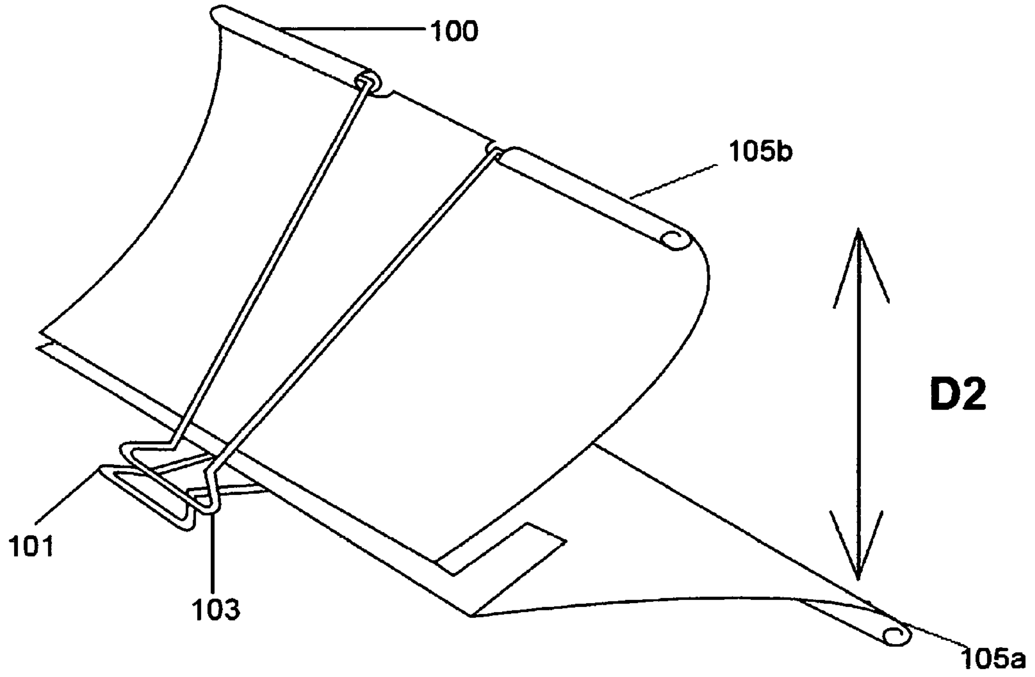
FIG. 5 illustrates the isometric view of the adjustable paper clip 100 opened at a distance of D2.

FIG. 5 illustrates the isometric view of the adjustable paper clip 100 opened a distance D2. The adjustable paper clip 100 is opened at the distance D2 when the user 106 opens the second end 105*a* of the first element and second end 105*b* of the second element using handles 101 and 103.

In the preferred embodiment, the user 106 wants to grip a desired size of paper bundle using the adjustable paper clip 100. The user 106 holds the first element 102 of the adjustable paper clip 100 and starts adjusting the male members 102*a*, 102*b* and 102*c* into the respective female members 104*a*, 104*b* and 104*c* of the second element 104. The user selects the appropriate gear, for example first gear a1, a2 and a3 of male members 102*a*, 102*b* and 102*c* respectively and adjust it with the female member 104*a*, 104*b* and 104*c* thereby enabling the user to move the handles 101 and 103 at a greater distance. Moreover, The pressure exerted by the curved surfaces 102*a*2, 102*b*2, and 102*c*2 on the female member 104*a*, 104*b* and 104*c* respectively ensures that the first element 102 and second element 104 does not separate and fall apart. Further, the actuation enables the spring (not shown) to compress and opens the second end 105*a* of the first element 102 and second end 105*b* the second element 104 at a required distance to grip the desired size of paper bundle.

In an embodiment, the user 106 wants to grip small size of paper bundle for example bundle containing 2-50 papers, the user holds the first element 102 of the adjustable paper clip 100 and start sliding the male members 102*a*, 102*b* and 102*c* into the female members 104*a*, 104*b* and 104*c* of second element 104 until the edges of the female members 104*a*, 104*b* and 104*c* are adjusted onto the third gear c1, c2 and c3 of the male members 102*a*, 102*b* and 102*c* respectively. Thereafter, the user 106 actuates the handles 101 and 103 of the adjustable paper clip 100 which facilitates the second end 105*a* of the first element 102 and second end 105*b* the second element 104 to open at the distance D1 and grip the desired size of paper bundle with the help of the adjustable paper clip 100.

In another embodiment, the user 106 wants to grip bigger size of paper bundle for example bundle containing more than 50-75 papers, the user holds the first element 102 of the adjustable paper clip 100 and start sliding the male members 102*a*, 102*b* and 102*c* into the female members 104*a*, 104*b* and 104*c* of second element 104 until the edges of the female members 104*a*, 104*b* and 104*c* are adjusted on the first gear a1, a2 and a3 of the male members 102*a*, 102*b* and 102*c*. Thereafter, the user 106 actuates the handles 101 and 103 of the adjustable paper clip 100 which facilitates second end 105*a* of the first element 102 and second end 105*b* the second element 104 to open at the distance D1 and grip the desired size of the paper bundle with the help of the adjustable paper clip 100.

In yet another embodiment, the user 106 continuously adjusts the first element 102 into the second element 104 of the adjustable paper clip 100 for obtaining a required distance of the second ends 105*a* of the first element 102 and second end 105*b* the second element 104 to open at a desired distance for different size of paper pile.

Although the exemplary embodiments of the present invention have been described for illustrative purposes, those skilled in the art will appreciate the adjustable paper clip 100 with multiple gears for gripping the required size of paper bundle thus eliminating the efforts of the user to purchase different variants of paper clips.

The invention claimed is:

1. A user adjustable paper clip, configured to grip a paper bundle, comprising:

a. a first curved element, further comprising a handle and a plurality of male members, wherein a single male member further comprises a first end, a second curved end, and a plurality of gears, such that the first end of the single male member is integrally connected to the first curved element; and b. a second curved element, further comprising a handle and a plurality of female members at a first end of the second curved element, wherein the plurality of female members is configured to slide onto the plurality of male members correspondingly, so as to adjust the distance between the first end of the single male member integrally connected to the first curved element and the first end of the second curved element in accordance with the desired size of the paper bundle; and pressure exerted by the second curved end of the single male member on a single female member respectively ensures that the first curved element and the second curved element do not separate.

2. The user adjustable paper clip of claim 1, wherein the first curved element and the second curved element are made up of plastic or any combination of plastic and steel.

3. The user adjustable paper clip of claim 1, wherein the breadth of the second curved end of the single male member of the first curved element is greater than the breadth of the single female member of the second curved element so as to keep the first curved element and the second curved element together and prevent separation.

4. The user adjustable paper clip of any of the claims 1-3, wherein the plurality of gears of the single male member of the first curved element is equal to three.

5. The user adjustable paper clip of any of the claim 1-3, wherein the plurality of male members and the plurality of female members is equal to three.

* * * * *